April 7, 1942.  E. W. McKINLEY  2,278,728
FLUID PRESSURE REGULATOR
Filed Feb. 9, 1940
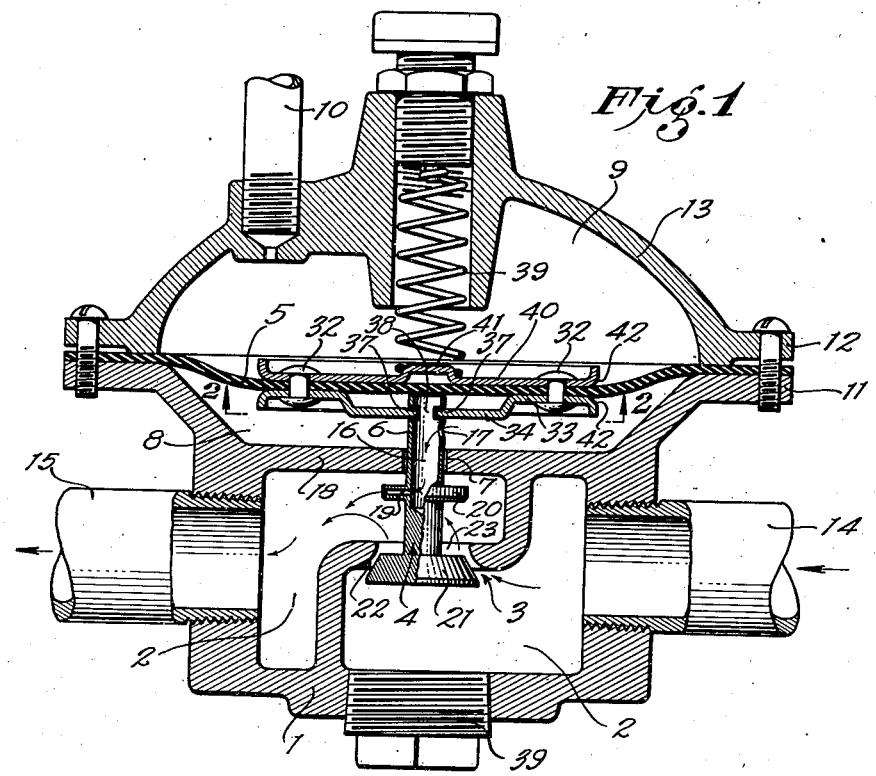
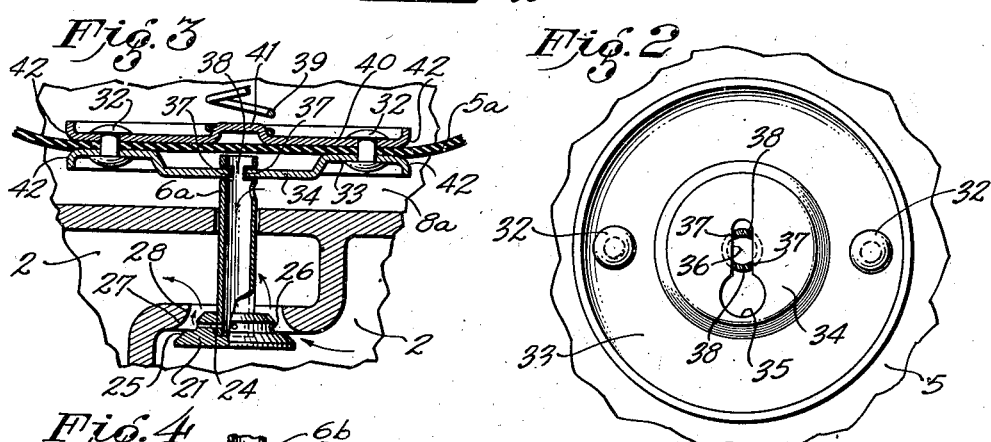
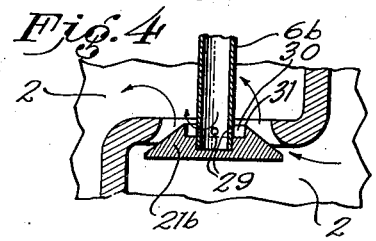
Inventor,
EDWIN W. McKINLEY.
By Lyon & Lyon
Attorneys Patented Apr. 7, 1942

2,278,728

UNITED STATES PATENT OFFICE 2,278,728

FLUID PRESSURE REGULATOR

Edwin W. McKinley, Los Angeles, Calif.

Application February 9, 1940, Serial No. 318,047

2 Claims. (Cl. 50—23)

This invention relates to fluid pressure control appliances, such as gas regulators. Regulators of this type are employed in service lines to maintain a substantially constant supply of gas to consumers under varying consumption by the consumer's gas burning appliances.

Such devices usually include a valve connected to a diaphragm in a pressure chamber, the pressure in which is controlled by the rate or volume of flow of gas passing through the device.

One of the objects of the invention is to provide simple means for effecting an immediate and sensitive control of the valve to regulate the effective valve opening, and adapt the same to any change in the quantity of gas that is required, and which is being supplied through the valve.

In a certain type of regulator, a small passage was provided leading from a point in the gas passage into the pressure chamber, with special features of form of the gas passage which were favorable to development of a nice control of the pressure in the pressure chamber. One of the objects of my invention is to provide a communicating passage from the gas passage to the pressure so located that it will have a greatly superior regulating control of the pressure in the pressure chamber, and consequently of the degree of valve opening.

Further objects of the invention will appear hereinafter.

The invention consists in the novel parts and combination of parts to be described hereinafter, all of which contribute to produce an efficient fluid pressure regulator.

A preferred embodiment of the invention is described in the following specification, while the broad scope of the invention is pointed out in the appended claims.

In the drawing:

Fig. 1 is a vertical section through a gas pressure regulator, and illustrating my invention applied to the same. This view shows the pipe connections partly in elevation and partly in section.

Fig. 2 is a horizontal section through the regulator taken about on the line 2—2 of Fig. 1, looking upwardly to further illustrate the connection from the valve stem to the diaphragm. This view, however, omits the casing and represents the outer portion of the diaphragm as broken away.

Fig. 3 is a fragmentary vertical section through the valve and valve seat, certain parts being broken away, and illustrating a modified embodiment of the control passage to the pressure chamber.

Fig. 4 is also a vertical section similar to Fig. 3, but showing only the lower end of the valve-stem and the valve, and illustrating a modified embodiment of the invention.

The drawing illustrates a gas pressure regulator having a body 1 with a gas passage 2 through the same, passing through a valve port 3, the effective opening through which depends upon the position of a valve 4 which is controlled by a pressure diaphragm 5. This valve has a stem 6, the upper end of which is guided through an opening 7 so that the upper end of the stem projecting into the pressure chamber 8, can be connected to the diaphragm 5. As is usual in regulators of this type, the air chamber 9 above the diaphragm may be vented to the atmosphere, or in some cases to a chamber having any desired gas pressure. Such a connection can be made through a pipe 10 leading off from the chamber 9.

The diaphragm 5 is clamped between the flange 11 on the body 1 and the flange 12 of the dome-shaped bonnet or regulator cover 13.

The fluid or gas flows through the regulator in the direction indicated by the arrows, from the inlet pipe 14, and passes out through the delivery pipe 15. In accordance with my invention, I provide the regulator with means whereby the velocity of flow of the gas determines the amount of pressure in the pressure chamber 8; and in the regulator illustrated, this is accomplished by providing the valve stem 6 with a duct 16 through which communication is established to the pressure chamber 8. For this purpose I prefer to employ a tubular valve stem, the upper end of which may have a port 17 to establish communication to the pressure chamber 8.

The duct 16 communicates with the valve passage above the valve closure 4, at some point such that changes in the velocity of flow of the fluid through the valve will vary the eductive effect, and thereby affect the pressure in the pressure chamber. In a modified form I prefer to do this by utilizing the valve face and seat to attain a Venturi effect.

The construction utilizing the Venturi effect, is illustrated in Figure 3.

In another embodiment of the invention illustrated in Figure 1, I obtain the eduction effect in the connection from the valve passage to the pressure chamber by providing a duct that emerges at the side of the valve toward the delivery end of the gas passage, and I locate this duct so that it is unnecessary to provide any opening through the dividing wall 18 other than the valve stem guide opening 7. In other words, I provide an eduction port or passage 19 that communicates at one end with the bore of the tubular stem 6 and emerges at its other end toward the "down stream" side or delivery end of the valve passage 2. In order to minimize any eduction effects on the clearance passage between the stem 6 and the face of the guide opening 7, I prefer to provide a baffle 20 in the form of a collar that projects out from the side of the stem 6, and the port or eduction passage 19 is preferably located in this collar on the "down stream" side. With this construction it will be evident that if an increased velocity of flow occurs for the fluid passing through the valve, an increased eduction effect will occur in the passage 19, which will withdraw some of the fluid in the pressure chamber 8, thereby occasioning a downward shifting of the movable control member of the regulator which, in the present instance, is the diaphragm 5.

If desired, the valve stem 6 may be made integral with the valve head or closure 21, and this valve head may be of conical type seating upon the conical or arcuate valve seat 22 through which the valve port 23 is formed.

In the embodiment of the invention illustrated in Fig. 3, that utilizes a Venturi effect, the construction of the upper portion of the valve stem 6a is substantially the same as that illustrated in Figure 1. The entire length of the valve stem, however, is tubular, and its lower end is secured in a valve head 21. This valve head is provided with one or more radial passages 24, the inner ends of which communicate with the bore of the valve stem 6a, and the outer ends of which emerge on the substantially conical side face 25 of the valve head. At the point of emergence I prefer to form a recess 26 in the valve face. If more than one of these radial passages 24 are employed, I prefer to connect them all together by forming the recess as an annular groove on the face of the valve. This groove is preferably located at about the most constricted point of the effective valve opening which is indicated by the numeral 27, above which point the face 28 of the passage curves away from the conical face and enlarges the cross-section for the flow of the gas.

With the valve having the features of construction illustrated in Figure 3, it will be evident that an increased velocity of flow for the gas which would be occasioned by an increased consumption of gas by the consumer, would have the effect of increasing the eduction effect in the tubular stem 6a, which would reduce the pressure in the pressure chamber 8a below the diaphragm 5a, causing the downward shift of the diaphragm, which would increase the opening of the valve.

In the embodiment of the invention illustrated in Figure 4, I locate the eduction port or ports at or about the level of the valve head 21b, but I do not form the eduction ports 29 so that they emerge on the face of the valve. In this construction I secure the valve head 21b rigidly to the valve stem 6b, which is of course, of tubular form, and the upper face of the valve is cut away so as to form a pocket or cylindrical chamber 30, the cylindrical wall of which intersects the conical face of the valve to form an edge 31. The ports 29 communicate with this pocket 30. As the gas flows up along the conical side face of the valve and past the edge 31, an eduction effect is developed in the pocket or chamber 30, and of course if the velocity of flow increases, this eduction effect increases, the result of which is that gas will be drawn out of the pressure chamber, causing the downward shift of the diaphragm and the valve head 21b, thereby giving an increased flow of gas to the consumer.

I prefer to employ an anti-leaking connection for connecting the stem 6 to the diaphragm 5. This connection is made in a way to avoid passing the stem through the diaphragm and is fully described in my copending application Serial No. 357,004.

Although it is possible to employ a cement or adhesive composition for this purpose, I prefer to employ rivets 32, but preferably only two such rivets are employed, disposed diametrically opposite to each other as illustrated in Figure 2. A socket plate 33 is provided, which, in the present instance is at the central part of the casing, and provided with a downwardly dished center or offset portion 34, and in this offset portion and removed from the central axis of the plate, I provide a small opening 35 sufficiently large to pass the upper end of the stem 6; and leading off laterally from the opening 35 toward the center of the plate, I provide a slot 36.

The upper end of the stem 6 is provided with two oppositely disposed cuts 37, leaving two narrow necks 38 in the wall of the tubular stem to pass into the slot, the cuts being slightly wider than the gauge or thickness of the plate.

In assembling the parts of the regulator, the valve 4 is put in place after removing an access plug 39 at the bottom of the valve body 1; and the opening 35 is slipped over the upper end of the stem, and the diaphragm is then shifted laterally to move the slot 36 into the cuts 37 and against the necks 38. With this construction it will be evident that the movements of the diaphragm will be imparted to the valve stem, but at the same time, by reason of the character of the connection between the stem and the diaphragm, considerable lost motion is established, permitting the stem 6 to be centered by the guide opening 7, so that it will hang vertically down; and preventing any tendency of the diaphragm to cock the stem 6 out of its proper vertical position. This feature is of some importance because it is the practice to provide ample clearance between the valve stem 6 and the guide opening 7.

In order to provide a seat for the usual coil spring 39, and also to cooperate in forming a gas-tight connection at the rivets 32, I provide the regulator with a spring seat 40 in the form of a thin plate, which is preferably of the same light gauge as the plate 33. This plate 40 is preferably formed with an upwardly offset boss 41 of the proper diameter to engage the lower end of the coil 39 and hold the same centered on the diaphragm.

In order to prevent the edges of the plates from cutting into the diaphragm when the same moves up or down, the margins of the two plates are bent away from the diaphragm in the usual manner to form curved cheeks 42 that may come more or less into contact with the diaphragm during these movements.

In practice, I have found that substantially no leakage occurs at the rivets 32. They are preferably of soft material, and when properly riveted, form a leak-tight connection at their heads, and also clamp the plates together with sufficient force to insure that no leakages can occur by gas passing between the faces of the diaphragm and the clamped faces of the plates.

Many other embodiments of the invention may be resorted to without departing from the spirit of the invention.

What I claim is:

1. In a fluid pressure regulator, the combination of a casing having a fluid passage therethrough for the fluid and having a pressure chamber with a wall separating the same from said passage, a movable member in the pressure chamber, a valve in said passage for controlling the flow through the same, said wall having a valve stem guide-opening therethrough; and a tubular stem passing through said guide-opening connecting said movable member and said valve, communicating at its upper end with the interior of said pressure-chamber, and having a port emerging at the side of the stem toward the delivery end of said fluid passage, said valve-stem having a baffle located adjacent the said guide opening for shielding the inner end of said guide-opening.

2. In a fluid pressure regulator, the combination of a casing having a fluid passage therethrough for the fluid and having a pressure chamber with a wall separating the same from said passage, a movable member in the pressure chamber, a valve in said passage for controlling the flow through the same, said wall having a guide-opening therethrough, a tubular stem guided therethrough, connecting said movable member with the valve and having a collar adjacent the valve-stem guide operating as a baffle for the same, said collar having a port therethrough communicating with the interior of the stem and emerging into the fluid passage toward the delivery end of the same.

EDWIN W. McKINLEY.